Aug. 4, 1959

R. L. WARREN 2,898,068

SUPPORT HAVING THREE AXES OF ADJUSTMENT
AND SINGLE LOCKING HANDLE

Filed Feb. 26, 1957

ROBERT L. WARREN
INVENTOR.

BY Lyon & Lyon

ATTORNEYS

United States Patent Office 2,898,068
Patented Aug. 4, 1959

2,898,068
SUPPORT HAVING THREE AXES OF ADJUSTMENT AND SINGLE LOCKING HANDLE

Robert L. Warren, Southgate, Calif.

Application February 26, 1957, Serial No. 642,544

7 Claims. (Cl. 248—183)

This invention relates to a universal work holding and supporting device which may be turned or tilted in any direction and then clamped in selected position by means of a single clamp screw or other clamping device.

Another object is to provide a device of this type wherein the single clamping device acts to contract one member about the work support and also acts to expand a rotary carrier into frictional engagement with the stationary base.

Other and more detailed objects and advantages will appear hereinafter.

Figure 1:
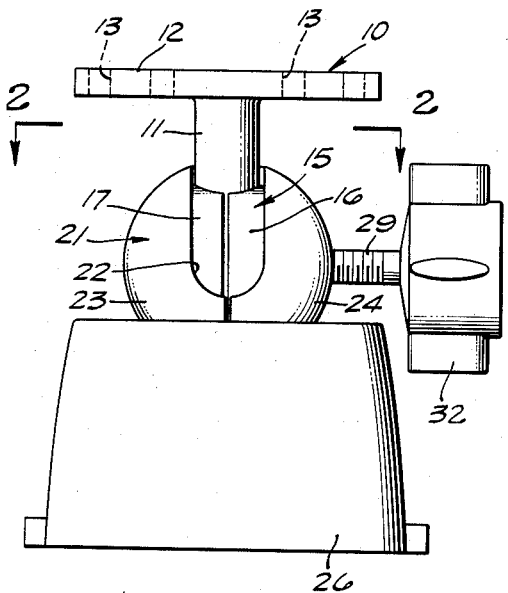
Figure 1 is a side elevation showing a preferred embodiment of my invention.
Figure 2:
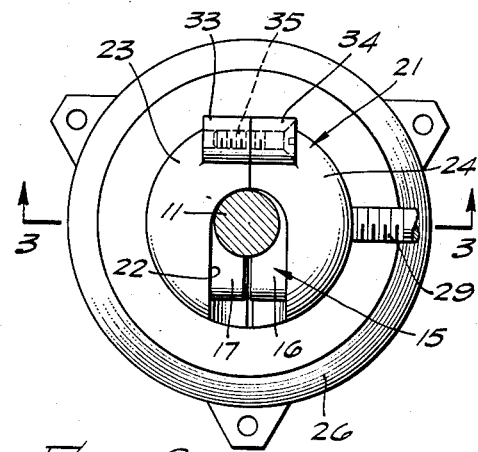
Figure 2 is a sectional plan view taken substantially on the lines 2—2 as shown in Figure 1.

Referring to the drawings, the work support member generally designated 10 includes a cylindrical post 11 carrying an apertured flange or table 12 at its outer end. The openings 13 are provided in the table 12 for fastening work of any nature to the upper surface of the table.

The post 11 is received within the cylindrical bore 14 of the split bushing generally designated 15. This bushing is split on a plane containing the axis of the post 11 to form two parts 16 and 17. The lower end of the post 11 rests on the end surface 18.

Figure 4:
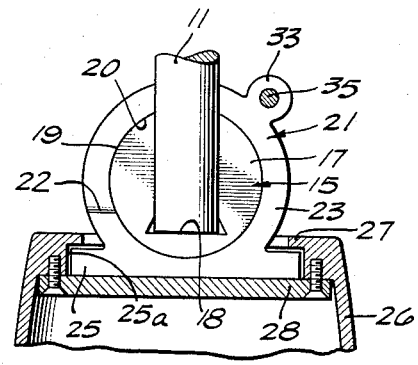
Figure 4 is a sectional elevation partly broken away, taken substantially on the lines 4—4 as shown in Figure 3.
Figure 3:
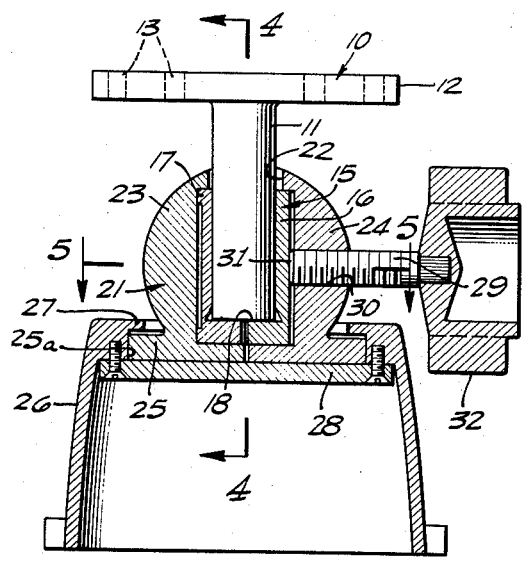
Figure 3 is a sectional elevation taken substantially on the lines 3—3 as shown in Figure 2.
Figure 5:
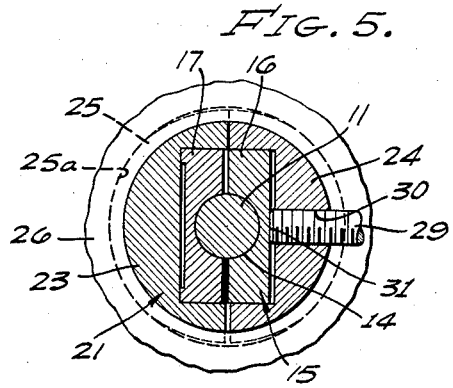
Figure 5 is a sectional detail taken substantially on the lines 5—5 as shown in Figure 3.

In side elevation, as shown best in Figure 4, the split bushing member 15 is generally circular and the outer cylindrical surface 19 is received within a cylindrical cavity 20 provided in the carrier 21. The axis of the cylindrical cavity 20 intersects the axis of the post 11 at right angles. An arcuate clearance slot 22 is provided in the carrier 21 and the post 11 extends through this slot. The carrier 21 is split into two separate elements 23 and 24 and the plane of separation is substantially the same as the plane of separation of the bushing halves 16 and 17.

The carrier 21 has a circular flange 25 which is received within a bore 25 in the stationary base 26. A lip 27 and a detachable retainer plate 28 maintain the flange 25 in position on the base 26. The base 26 may be secured to a work bench or table or other support by any convenient means.

Assuming that the base 26 is secured to a horizontal surface, the carrier 21 is free to turn with respect to the base about a vertical axis. The split bushing 15 is free to turn with respect to the carrier 21 about a horizontal axis and the extent of movement is limited by the length of the arcuate slot 22. The post 11 is free to turn with respect to the bushing 15 about its own longitudinal axis.

All of these motions may be arrested simultaneously and the parts clamped in any adjusted position by means of the single clamping screw 29. This screw is received in the threaded bore 30 of the part 24 and this threaded bore 30 is co-axial with the turning axis of the bushing 15. The inner end 31 of the clamping screw 29 abuts the outer surface of the bushing section 16. A manually operable knob 32 is fixed on the other end of the clamping screw 29.

When the knob 32 is turned in a direction to advance the screw 29 in a direction towards the post 11, the post 11 is clamped frictionally between the halves 16 and 17 of the split bushing 15. Reaction force of the screw 29 on the part 24 serves to spread the parts 23 and 24 of the carrier 21 and this latter spreading action causes the flange 25 to be gripped frictionally within the enclosing shoulder of the bore 25a on the base 26.

The result is that all of the parts are frictionally clamped against movement by the action of the single clamping screw 29. Accordingly, the craftsman can use one hand to adjust the position of the work support 10 and use the other hand to clamp all of the parts holding the work support in its adjusted position.

Gears 33 and 34 may be formed integrally on the parts 23 and 24 respectively and these gears may be connected by a central threaded fastener 35. This construction assures that the carrier 21 swivels as a unit with respect to the base 26 and yet does not interfere with the spreading action between the parts 23 and 24 under action of the clamping screw 29.

It will be understood that the work supporting table 12 may take any convenient or desirable form and may be equipped with a vise or work grips of any desired form.

Having fully described my invention, it is to be understood that I do not wish to be limited to the details herein set forth, but my invention is of the full scope of the appended claims.

I claim:

1. In a work support device, the combination of a post, a split bushing having a bore receiving the post, a split carrier having a cavity for reception of the bushing, and permitting turning movement of the bushing about a certain axis, a stationary base supporting the carrier for rotary movement about an axis normal to the first said axis, and a clamp means engaging the carrier and the split bushing, the clamp means being adapted to contract the bushing on the post and to expand the carrier into engagement with the base, whereby movement of the carrier and bushing is prevented.

2. In a work support device, the combination of a post, a split bushing having a bore receiving the post, a split carrier having a cavity for reception of the bushing, and permitting turning movement of the bushing about a horizontal axis, the carrier having an arcuate clearance opening through which the post extends, a stationary base supporting the carrier for rotary movement about a vertical axis, and a clamp screw on the carrier engaging the split bushing, the clamp screw being adapted to contract the bushing on the post and to expand the carrier into engagement with the base, whereby movement of the carrier and bushing is prevented.

3. In a work support device, the combination of a cylindrical post, a split bushing having a cylindrical bore receiving the post for turning movement therein, a split carrier having a cavity for reception of the bushing, and permitting turning movement of the bushing about a horizontal axis, the carrier having an arcuate clearance opening through which the post extends, a stationary base supporting the carrier for rotary movement about a vertical axis and having an annular internal shoulder, and a clamp screw on the carrier engaging the split bushing, the clamp screw being adapted to contract the bushing on the post and to expand the carrier into engagement with the shoulder on the base, whereby movement of the carrier, bushing and post is prevented.

4. In a work support device, the combination of a cylindrical post, a split bushing having a cylindrical bore receiving the post for turning movement therein, a split carrier having a cavity for reception of the bushing, and permitting turning movement of the bushing about a horizontal axis, the carrier having an arcuate clearance opening through which the post extends, a stationary base supporting the carrier for rotary movement about a vertical axis, and a clamp coaxial with said horizontal axis engaging the bushing and the carrier, the clamp screw being adapted to contract the bushing on the post and to expand the carrier into engagement with the base, whereby movement of the carrier, bushing and post is prevented.

5. A supporting device, comprising: a base member; an expansible and connectible carrier mounted on said base for rotation about a primary axis and having a cavity therein defining a secondary axis; an expansible and contractible bushing journaled in said cavity for movement about said secondary axis and having a bore defining a tertiary axis; a post journaled in said bore for movement about said tertiary axis; and means simultaneously engageable with said bushing and carrier to expand said carrier, thereby to secure said carrier relative to said base against movement about said primary axis to force said bushing against a wall of said cavity, thereby to secure said bushing relative to said carrier against movement about said secondary axis and to clamp said bushing about said post, thereby to secure said post relative to said bushing against movement about said tertiary axis.

6. A supporting device, comprising: a base member; an expansible and connectible carrier mounted on said base for rotation about a primary axis and having a cavity therein defining a secondary axis; an expansible and contractible bushing journaled in said cavity for movement about said secondary axis and having a bore defining a tertiary axis; a post journaled in said bore for movement about said tertiary axis; and means movable along said secondary axis for simultaneously fixing said post, bushing, and carrier against movement about their respective axes.

7. A supporting device, comprising: a base member having a journaling means defining a primary axis; a carrier rotatably mounted in said journaling means for movement about said primary axis, said carrier having complementary elements relatively movable for binding engagement in said journaling means to fix said carrier relative to said primary axis, said complementary elements having therebetween a cavity defining a secondary axis; a bushing including complementary members journaled about said secondary axis within said cavity, at least one of said complementary members being movable into binding engagement with said carrier to fix said bushing relative to said secondary axis, said complementary members forming therebetween a bore defining a tertiary axis and said complementary elements also defining an arcuate slot radially of said cavity exposing said bore; a post journaled in said bore about said tertiary axis and extending through said slot; and means operable to effect simultaneous fixing of said post, bushing, and carrier relative to their respective axes of movement.

References Cited in the file of this patent

UNITED STATES PATENTS

| | | |
|---|---|---|
| 1,735,149 | Werner | Nov. 12, 1929 |
| 1,854,951 | Neuwirth | Apr. 19, 1932 |
| 2,261,426 | Willcox | Nov. 4, 1941 |
| 2,524,172 | Miller et al. | Oct. 3, 1950 |
| 2,586,721 | Rubin | Feb. 19, 1952 |
| 2,802,633 | Moore | Aug. 13, 1957 |